Sept. 15, 1931.    J. C. MEEM    1,823,370
CONVEYER APPARATUS
Filed Feb. 21, 1929
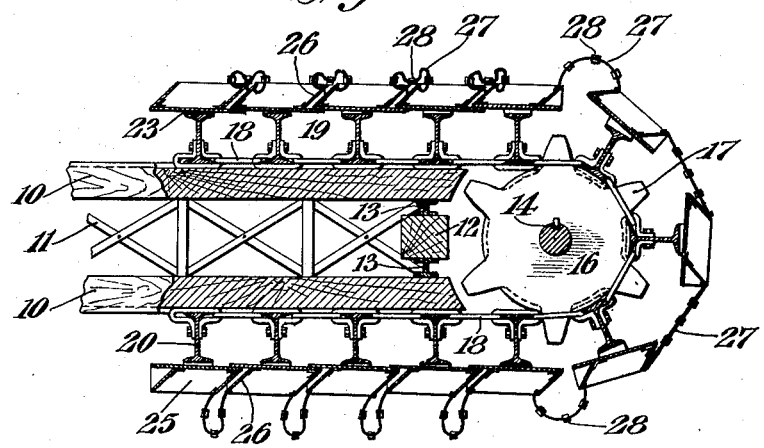
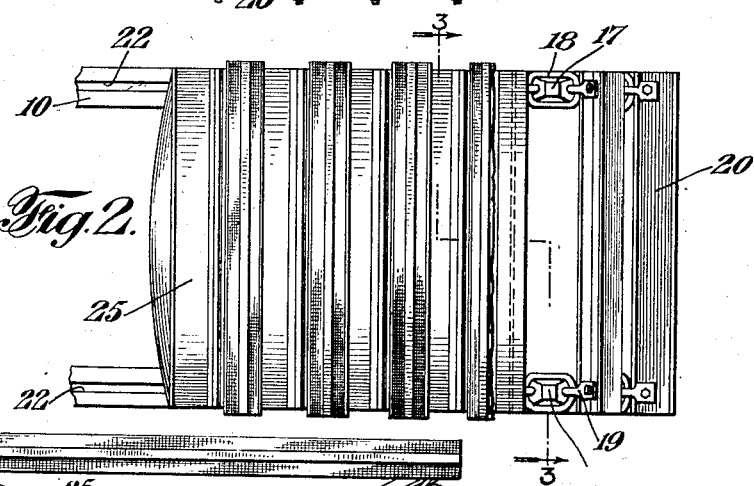
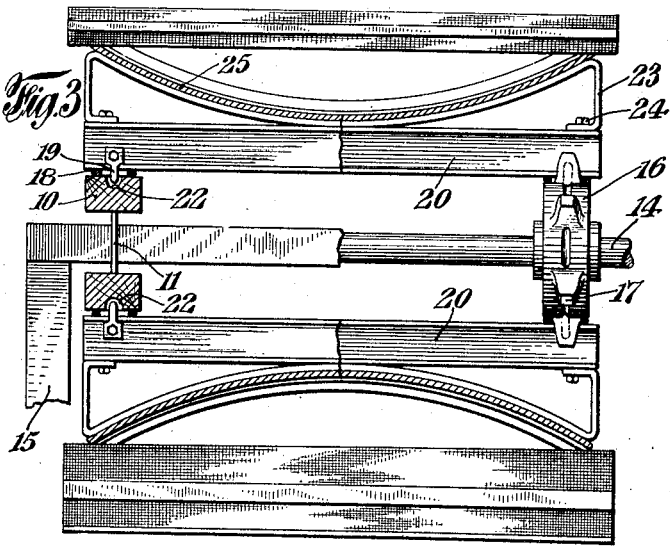
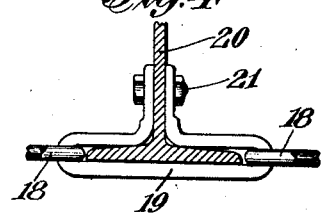
INVENTOR
James C. Meem
BY
Edwards and Bower
ATTORNEYS Patented Sept. 15, 1931

1,823,370

UNITED STATES PATENT OFFICE

JAMES C. MEEM, OF BROOKLYN, NEW YORK

CONVEYER APPARATUS

Application filed February 21, 1929. Serial No. 341,615.

This invention relates to sectional conveyers and more particularly to conveyers which may be readily adjusted to various lengths and provided with interchangeable and removable sections and having means for preventing material conveyed from falling into the operating mechanism of the conveyer.

The object of this invention is to provide a simple, inexpensive sectional conveyer which is readily assembled to any desired length and which is adapted to convey heavy loads without any of the conveyed materials falling into the operating mechanism as the pans or buckets separate in turning with the sprocket wheels.

A further object of the invention is to provide an endless sectional conveyer provided with interchangeable sections so that the conveyer can be readily converted from a horizontal moving conveyer to a vertically lifting conveyer.

Further objects and advantages will be apparent from the following specification and drawings in which Fig. 1 is a sectional view of a conveyer constructed in accordance with this invention.

Fig. 2 is a plan view of Fig. 1 with portions broken away for clearness.

Fig. 3 is a sectional view taken on line 3—3 of Fig. 2, and

Fig. 4 is an enlarged, detailed sectional view.

In the drawings the supporting frame work is constructed of longitudinal supports 10 spaced longitudinally by any suitable supports such as supporting framework 11. At spaced intervals the supports 10 are spaced laterally of the conveyer by lateral supports 12 secured thereto by I beams 13 bolted or otherwise secured thereto. This entire supporting framework can be constructed of any desired length as the longitudinal supports 10 are provided in standard lengths and therefore can be inserted and removed as desired with the necessary supporting framework 11 and lateral supports 12.

At each end and extending laterally of the conveyer frame structure is a shaft 14 supported for rotation by any suitable framework such as the frame 15. Keyed or otherwise secured at each end of each shaft 14 is a sprocket 16 adapted to rotate with the shafts. These sprockets are provided with teeth 17 which fit within the horizontal links 18 of the endless parallel chains for moving the conveyer as a unit at any desired speed.

The vertical links 19 of the chain are split or open, the ends of which are flattened and extended parallel to each other to conform substantially to the shape of the flanges and web sections of the lateral members or as illustrated I beams 20 as shown in enlarged detail in Fig. 4. The ends of the lateral members or I beams 20 are slipped into the links 19 and are secured thereto by bolts 21 passing through holes in the flattened ends of the links 19 and a registering hole in the web section of the I beams 20.

To each lateral member or I beam 20 is secured an inclined support 23 by bolts 24 to which is secured the overlapping pans or buckets 25 of any desired shape, the pans or buckets 25 as illustrated cross sectionally in Fig. 3 forming a circular trough. The pans or buckets 25 due to the inclined supports 23 and because of the necessity of the overlapping of each bucket are slightly inclined from the horizontal as shown in Fig. 1. This overlapping of the pans or buckets provides a trough conveyer belt upon which the materials to be conveyed are loaded and conveyed to the desired location.

To prevent conveyed material from falling into the operating mechanism such as the sprocket 16 of the conveyer, each pan or bucket 25 has secured thereto adjacent opposite ends butts or headers 26 of light material such as wood or steel. To adjacent butts or headers 26 of adjacent pans or buckets 25 are attached sections of flexible material 27 such as canvas, rubber or like material which will bridge the space between adjacent buckets as they separate when turning around the sprocket 16 from their substantially horizontal position so as to prevent any conveyed material from falling into the operating mechanism below the pans or buckets 25 more clearly shown in Fig. 1.

The flexible material 27 is provided with longitudinal stiffness or bracing members 28 attached thereto in any manner such as having one member on either side of the flexible member with a fastening means passing through both members.

If it is desired to operate the conveyer belt as a lifting belt so as to lift and convey materials in a vertical or inclined direction where a continuous trough conveyer is unsuited, the supports 23 with the pans or buckets 25 secured thereto which form a horizontal conveying trough are removed from the lateral members or I beams 20 by removing bolts 24 and attaching to every other lateral member or I beam 20 a support 23 to which is secured a lifting bucket of any suitable shape and thereafter connecting adjacent buckets with flexible materials 27 if required.

It will be readily seen that the conveying apparatus can be adjusted to any desired length by adding or removing sections of the supporting frame structure and sections of the chain belts with the necessary elements secured thereto. Furthermore the conveying apparatus as described is so constructed that the interchangeable parts can be replaced if breakage occurs without the necessity of replacing the entire moving elements.

While this invention is illustrated and described more particularly with reference to endless sectional conveyers for sand, gravel, brick and the like, the invention is not confined thereto but is intended to cover any other uses or modifications within the scope of the appended claims.

I claim:

1. In combination with a conveyer provided with adjacent overlapping pans to form a trough-like conveyer, header members extending crosswise of said pans and secured thereto at opposite ends of each pan, flexible material secured to said header members of adjacent pans and adapted to bridge the space between said pans when said overlapping pans separate.

2. In combination with a conveyer provided with adjacent overlapping pans to form a trough-like conveyer, header members extending crosswise of said pans and secured thereto at opposite ends of each pan, flexible material secured to said header members of adjacent pans adapted to bridge the space between said pans when said overlapping pans separate and bracing members extending crosswise of said pans secured to said flexible material at spaced intervals.

3. In combination with a conveyer provided with adjacent overlapping pans to form a trough-like conveyer, header members extending crosswise of said pans and secured thereto at opposite ends of each pan, flexible material secured to said header members of adjacent pans, and bracing members extending crosswise of said pans and extended beyond the width of said pans secured to said flexible material at spaced intervals.

4. In a substantially horizontally disposed conveyer mechanism, the combination of an endless carrier, a plurality of containers mounted thereon at regularly spaced intervals, each container comprising a curved trough-like body portion and end closures fixedly connected therewith, the end closures of each container being disposed so that they may have overlapping relationships with the closures of adjacent containers, and flexible sheets connecting adjacent containers and secured to the top portions of their end closures, the sheets together with the entire interiors of the containers constituting a continuous surface that prevents any spilling of material.

5. In a substantially horizontally disposed conveyer mechanism the combination of an endless carrier, a plurality of containers mounted thereon at regular spaced intervals each container comprising a curved trough-like body portion and end closures fixedly connected therewith, the end closures of each container being disposed so that they may have overlapping relationships with the closures of containers, and flexible sheets connecting adjacent containers and secured to the top portions of their closures, each sheet having a plurality of rigid cross pieces secured to it at intervals said cross pieces extending crosswise of the sheet and being effective to keep the sheet in alignment and protect it from injury without interfering with the flexibility of those portions of it between the cross pieces, the sheets together with the entire interiors of the containers constituting a continuous surface that prevents any spilling of material.

JAMES C. MEEM.